(12) United States Patent
Johnson

(10) Patent No.: US 11,695,843 B2
(45) Date of Patent: Jul. 4, 2023

(54) USER ADVANCED MEDIA PRESENTATIONS ON MOBILE DEVICES USING MULTIPLE DIFFERENT SOCIAL MEDIA APPS

(71) Applicant: Johnson, J.R., Manhattan Beach, CA (US)

(72) Inventor: J. R. Johnson, Manhattan Beach, CA (US)

(*) Notice: Subject to any disclaimer, the term of this patent is extended or adjusted under 35 U.S.C. 154(b) by 104 days.

(21) Appl. No.: 17/090,266

(22) Filed: Nov. 5, 2020

(65) Prior Publication Data

US 2021/0392191 A1 Dec. 16, 2021

Related U.S. Application Data

(60) Provisional application No. 62/896,722, filed on Sep. 6, 2019.

(51) Int. Cl.
| | |
|---|---|
| *H04L 67/51* | (2022.01) |
| *G06F 3/04842* | (2022.01) |
| *G06F 9/48* | (2006.01) |

(52) U.S. Cl.
CPC .......... *H04L 67/51* (2022.05); *G06F 3/04842* (2013.01); *G06F 9/48* (2013.01)

(58) Field of Classification Search
CPC ......... H04L 67/16; H04L 67/51; H04L 67/20; H04L 67/53; H04L 67/125; G06F 3/04842; G06F 9/48; G06Q 10/10; G06Q 50/01; G06Q 50/00
See application file for complete search history.

(56) References Cited

U.S. PATENT DOCUMENTS

| | | | |
|---|---|---|---|
| 2011/0093560 A1* | 4/2011 | Morris | H04L 67/02 709/217 |
| 2013/0235034 A1* | 9/2013 | Reitan | G06F 8/315 345/419 |
| 2015/0121420 A1* | 4/2015 | Wellen | H04N 21/6125 725/32 |
| 2016/0349951 A1* | 12/2016 | Greenberg | H04L 51/52 |
| 2017/0041381 A1* | 2/2017 | Tal | H04L 67/30 |
| 2017/0230720 A1* | 8/2017 | Archibong | H04N 21/23418 |
| 2017/0351388 A1* | 12/2017 | Grunewald | H04M 1/72406 |
| 2018/0189402 A1* | 7/2018 | Mullaney | G06Q 50/01 |
| 2019/0147017 A1* | 5/2019 | Tran | G06Q 10/10 715/720 |

* cited by examiner

*Primary Examiner* — Anh Nguyen
(74) *Attorney, Agent, or Firm* — Baker Botts L.L.P.

(57) ABSTRACT

A distributed computer system including a story application for a mobile computing device enables presentation of media using multiple different real or virtual social media apps executed using the mobile computing device. Under control of a programmed story script, and in response to input signals to advance a media presentation, the story application selectively invokes a particular social media app, from among a plurality of different social media apps installed on the mobile device and instructs the particular social media app to present or play a particular story element of the media presentation. Successive story elements are presented serially in response to successive input signals, without interruption of other apps that may be running on the mobile device. In this manner, media presentations such as entertainment programs or stories may be presented using multiple different social media apps rather than via passive video playback.

21 Claims, 6 Drawing Sheets

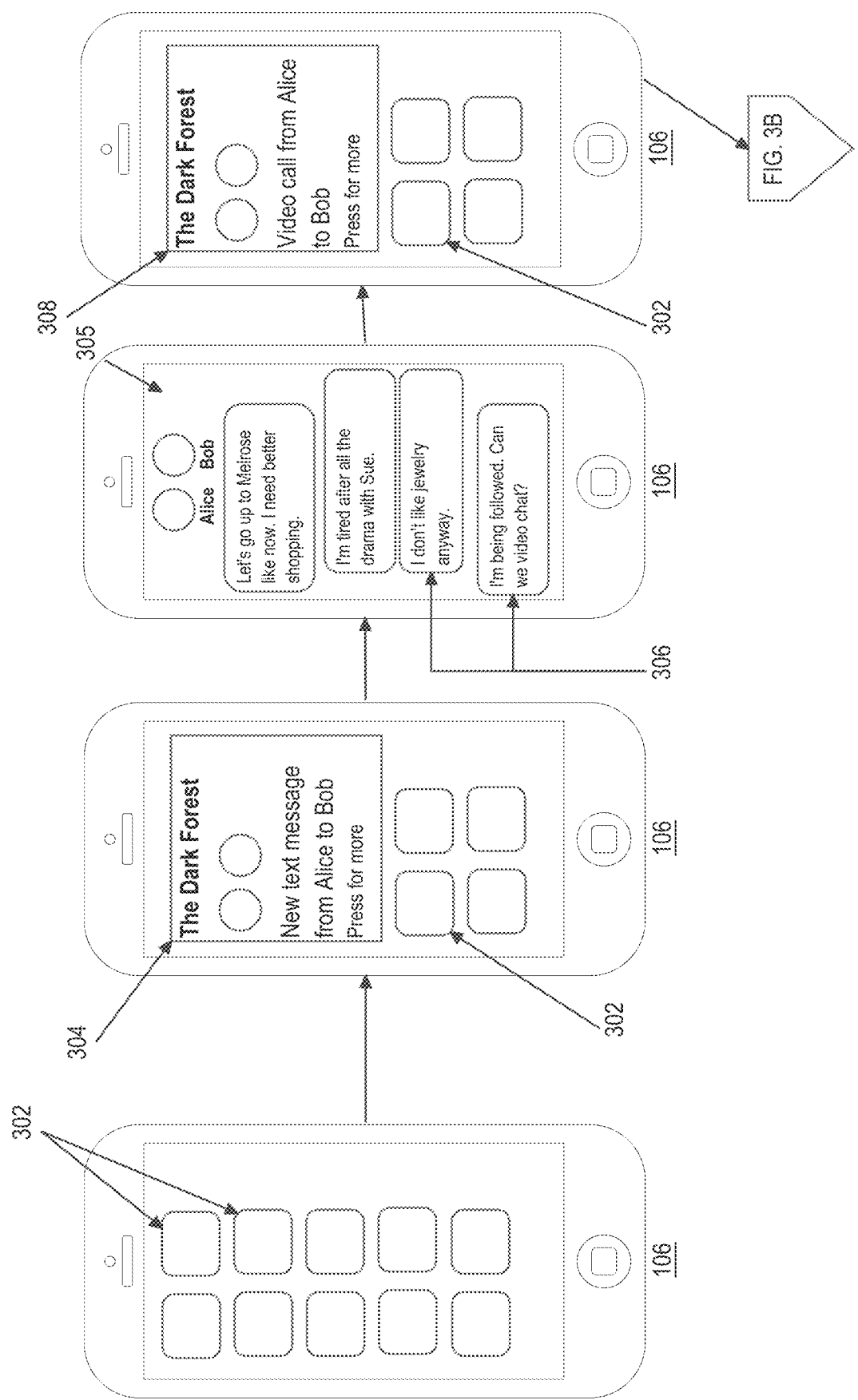

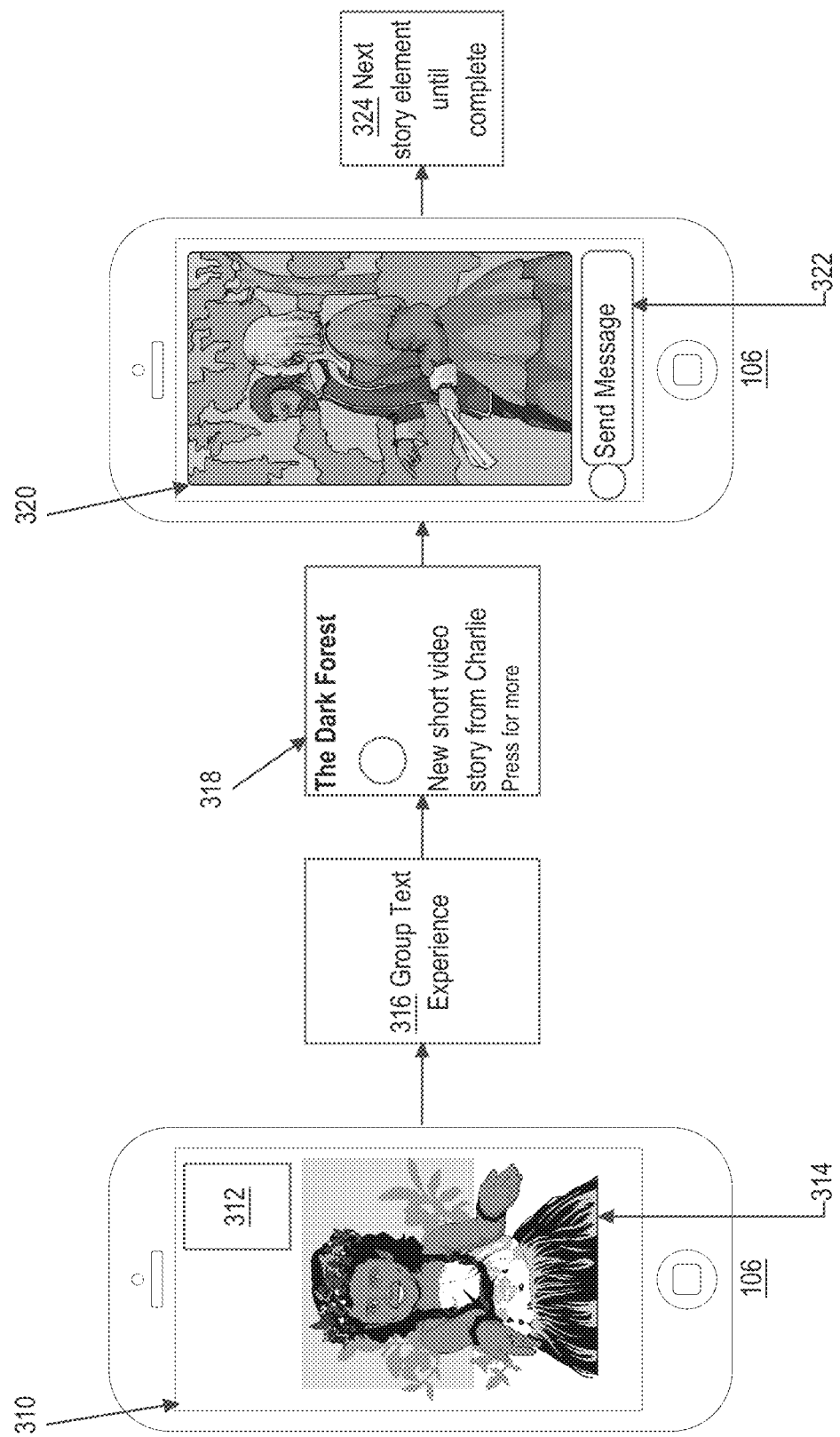

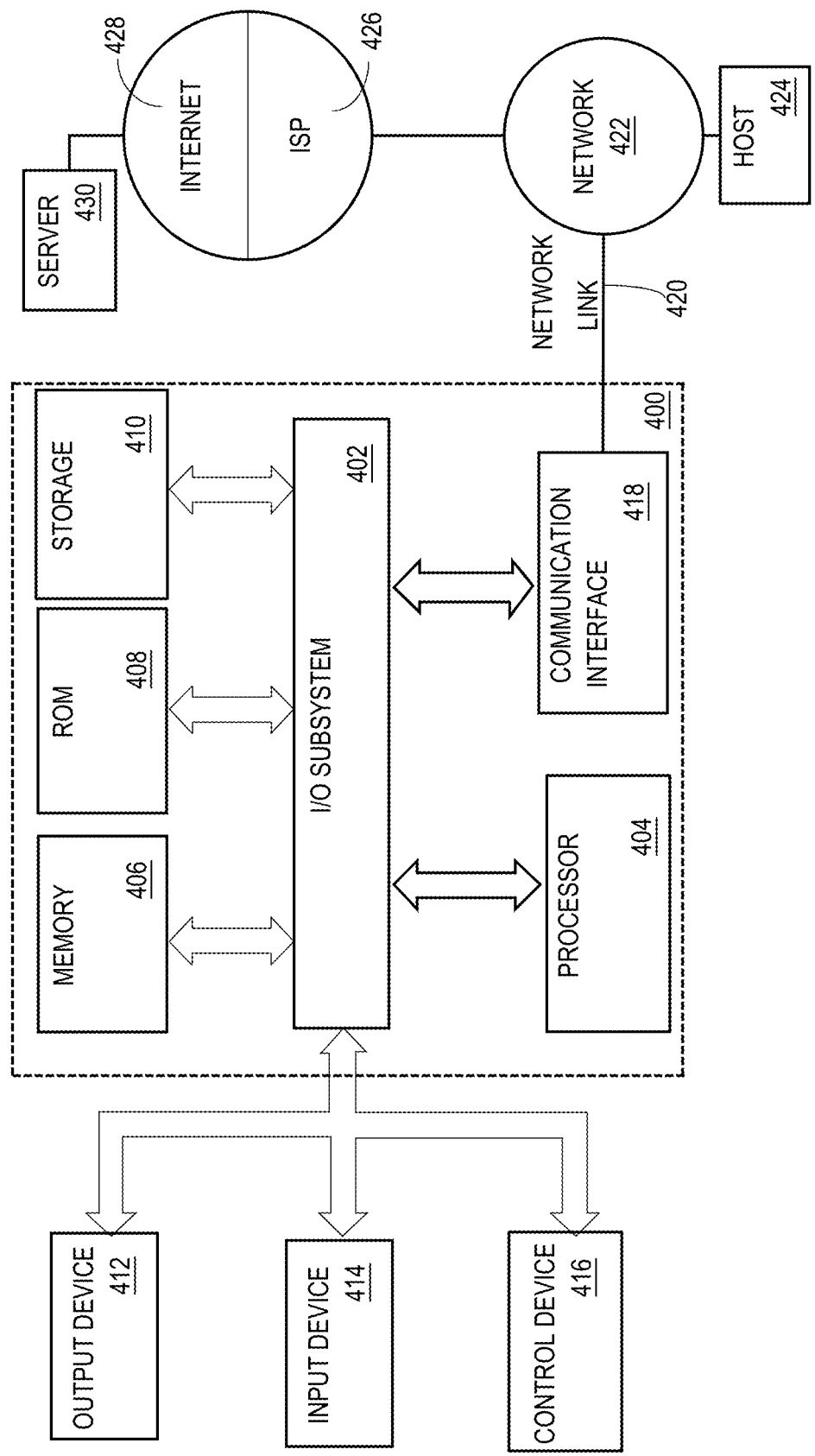

USER ADVANCED MEDIA PRESENTATIONS ON MOBILE DEVICES USING MULTIPLE DIFFERENT SOCIAL MEDIA APPS

BENEFIT CLAIM

This application claims the benefit of provisional application 62/896,722, filed Sep. 6, 2019, the entire contents of which are hereby incorporated by reference for all purposes as if fully set forth herein.

FIELD OF THE DISCLOSURE

One technical field of the present disclosure is presentation of media such as video and text on mobile computing devices. Another technical field is the invocation and use of social networking applications on mobile computing devices. Another technical field is production and presentation of motion pictures, television programs and other media.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Mobile computing devices are widely used by people of all ages. Social networking applications or apps have become ubiquitous and support communication of text, sharing short videos, sharing images and locations, and other functions involving text, images or video with sound. Other apps for person-to-person video calls or videoconferencing also are widely used.

The presentation of media, including dramatic or comedic stories, documentaries, and informational programming, occurs through a variety of means including motion pictures, television and streaming video services. However, these media have significant technical limitations. User control of a presentation typically is limited to playback, fast forward and rewind on a continuous basis rather than with reference to story elements, events or plot points. User interaction is basically passive; the user watches and a player outputs or renders the program. With these approaches, apps on mobile computing devices are under-utilized. Furthermore, the actions of characters in the programs are not well aligned with the daily experience of users in interacting with mobile computing devices and apps, especially social media apps.

SUMMARY

The appended claims may serve as a summary of the invention.

BRIEF DESCRIPTION OF THE DRAWINGS

In the drawings:
FIG. 3A, FIG. 3B illustrate a mobile computing device displaying a progressive sequence of story elements via a graphical user interface.
FIG. 4 illustrates an example computer system with which some aspects of embodiments may be implemented.

DETAILED DESCRIPTION

Figure 1:
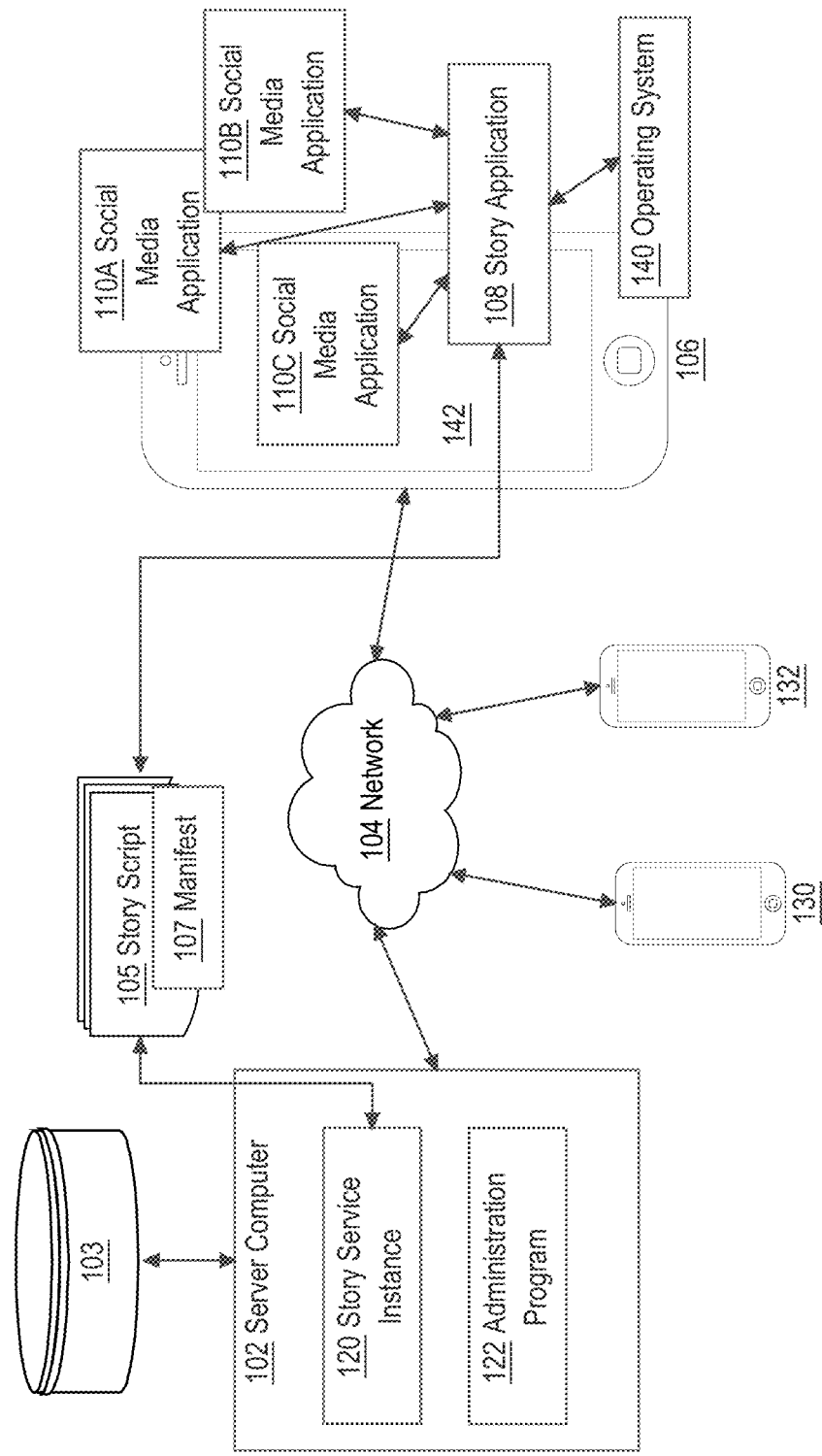
FIG. 1 illustrates an example distributed computer system that may be used to implement an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:
1. GENERAL OVERVIEW
2. EXAMPLE DISTRIBUTED COMPUTER SYSTEM
3. EXAMPLE PROGRAM FLOW
4. EXAMPLE STORY PRESENTATION
5. IMPLEMENTATION EXAMPLE—COMPUTER HARDWARE OVERVIEW

1. General Overview

A distributed computer system including a story application for a mobile computing device enables presentation of media using multiple different real or virtual social media apps executed using the mobile computing device. Under control of a programmed story script, and in response to input signals to advance a media presentation, the story application selectively invokes a particular social media app, from among a plurality of different social media apps installed on the mobile device and instructs the particular social media app to present or play a particular story element of the media presentation. Successive story elements are presented serially in response to successive input signals, without interruption of other apps that may be running on the mobile device.

In this manner, media presentations such as entertainment programs or stories may be presented using multiple different social media apps rather than via passive video playback. Furthermore, the social media apps already installed on the mobile device become a new, integrated means of storytelling that amplifies the utility of the social media apps and executes a storytelling mechanism that has been previously unavailable.

In particular embodiments, a mobile computing device may receive, at a story application of the mobile computing device, a selection of a first story and retrieve a digitally stored story script corresponding to the first story. From the story script, a first story element may then be identified. The mobile computing device may invoke a first social media application on the mobile computing device and programmatically cause the first social media application to present the first story element. Finally, the first story element may be presented at the first social media application. The identifying and invoking steps may be repeated for a plurality of other different story elements and different other social media applications.

In further embodiments, a server may receive, from a mobile computing device, a selection of a first story. The server may then retrieve a first story script corresponding to the first story and download the first story script and a manifest to the mobile computing device. This manifest may specify a plurality of different social media applications that the first story will invoke. The server may subsequently receive, from the mobile computing device, a request for a first story element associated with the first story script and correspondingly download or stream the first story element to the mobile computing device. Finally, server may receive, from the mobile computing device, a signal indicating completion of the first story at the mobile computing device.

2. Example Distributed Computer System

FIG. 1 illustrates an example distributed computer system that may be used to implement an embodiment.

In an embodiment, a server computer 102 is programmed with a story service instance 120 and an administration program 122 and is communicatively coupled to a database 103 that may store a plurality of story service programs, story scripts and media manifests as further described in other sections. In various embodiments, server computer 102 may comprise any of a desktop computer, rack installed server, cluster of computers, or one or more virtual machine instances that are instantiated and executed using computer hardware in a datacenter or cloud computing facility.

In an embodiment, server computer 102 is communicatively coupled to a network 104, which broadly represents any one or more of a local area network (LAN), wide area network (WAN), datacenter network and/or one or more internetworks using any of wired, wireless, terrestrial or satellite data communication links.

A plurality of mobile computing devices 106, 130, 132 are communicatively coupled to network 104 and therefore capable of communicating with server computer 102 using internetworking protocols such as TCP/IP, application-level protocols such as HTTP, and/or application or app protocols for communication between server-side applications and mobile device apps, such as parameterized HTTP. For purposes of illustrating a clear example, FIG. 1 shows three (3) mobile computing devices 106, 130, 132, but in other implementations, any number of mobile computing devices may be used, and this disclosure specifically contemplates using one or more server computers 102 to interoperate with thousands or millions of mobile computing devices.

Each of the mobile computing devices 106, 130, 132 may comprise any of a smartphone, tablet computer, laptop computer, vehicle computer or other transportable computing device. Referring to mobile computing device 106 as an example, in an embodiment, each of the mobile computing devices is programmed with, has installed or executes a story application 108, a plurality of different social media applications or apps 110A, 110B, 110C and an operating system 140.

Mobile computing device 106 further comprises a touch-sensitive display device 142 such as a liquid crystal display (LCD), light-emitting diode display or other electronic digital display device capable of displaying media such as text, images and video. The display device 142 may comprise means for detecting touches of human fingers, taps or gestures on the display device, such as a capacitive overlay film that is electronically coupled to a detection circuit and firmware programmed to signal the operating system 140, or a device driver, when touch is detected and the location in terms of coordinates or pixel locations of a touch, tap or gesture.

Mobile computing device 106 further comprises a loudspeaker, microphone, one or more pushbuttons for signaling, volume control buttons, a power on-off button and other hardware, electronics, firmware and software as is conventional for smartphones, tablet computers and the like. These elements are not shown in FIG. 1 to avoid obscuring the focus of the disclosure.

At the server computer 102, the story service instance 120 represents one instance or executing process of a set of computer program instructions that implement a media presentation, program or story for one or more mobile computing devices. Each story service instance 120 provides programmed, server-side services to one or more mobile computing devices to support the presentation of media presentations, programs or stories that are output on the mobile computing devices. For example, in one embodiment, at the time that a mobile computing device 106 requests presenting a media presentation, the story service instance 120 establishes an app-specific protocol connection with the story application over the network 104 and transmits or downloads a story script 105, alone or in association with a media manifest 107, to story application 108.

As another example, when the story application 108 launches, or during its execution, story service instance 120 provides, validates and/or downloads one or more media elements such as text, video, images to the story application 108 for presentation on display device 142. In some embodiments, during execution of story application 108, story service instance 120 is programmed to deliver other story elements as needed, and/or to stream video, audio or other streaming media elements to the story application for presentation. Thus, in various embodiments, all media elements needed to present a media presentation on the display device 142 may be provided to the mobile device 106 before the story application 108 launches, when it launches or during execution.

In an embodiment, story script 105 comprises a digitally stored sequence of symbolic instructions that specify a sequence of story elements or media elements of a media presentation, particular social networking apps to be used for presentation of those elements, and specific invocation instructions, parameter values or attribute values that the social networking apps may require for correct or effective presentation of the elements. A copy of story script 105 is delivered to each instance of story application 108 on each mobile computing device 106, 130, 132. In various embodiments, story script 105 is transmitted to mobile computing device 106 and story application 108 at the time that the story application is installed on the device, when the story application launches, or during execution of the story application.

The story script 105 serves as a programmed driver of a media presentation and is parsed or interpreted by story application 108 on a real-time or just-in-time basis when the story application launches and executes, resulting in delivering a media presentation. In various embodiments, story script 105 may be expressed in any of a human-readable scripting language, programming language and/or machine language, code, bytecode or byte stream that the story application 108 is capable of executing directly, interpreting or parsing.

In some embodiments, a manifest 107 is integrated with each copy of story script 105 that is transmitted to mobile computing devices. Manifest 107 may be implemented as a header section in story script 105 or delivered separately. Manifest 107 may be transmitted from story service instance 120 to mobile computing device 106 and story application 108 at the time that the story application is installed on the device, when the story application launches, or during execution of the story application.

In an embodiment, manifest 107 comprises a complete list of universal resource locators (URLs), other network references, and/or filenames of text files, video files, audio files, graphics files or other media assets or story elements that are needed to present a particular media presentation on mobile computing device 106. The manifest 107 may use obfuscation, encoding, encryption or other transformations to obscure or secure the contents of the manifest, and story application 108 may be programmed with reverse transformation logic and/or decryption keys as necessary to decrypt or reverse the obfuscation or encoding of the manifest 107 to obtain usable references to story elements. In this manner, manifest 107 may serve as a basis for story application 108 to validate or verify, at the time of installation, launch or execution, that the mobile computing device then currently stores all media assets needed to effectively present a media presentation.

Administration program 122 may be programmed or configured to implement server-side administration functions such as the programming of story script 105, configuration of manifest 107, interfacing with database 103, creating and storing data to form a basis of analytics calculations relating to use of media presentations and/or instances of story application 108 at mobile computing devices 106, 130, 132, activating and deactivating particular media presentations to make them available or unavailable for transmission or downloading to mobile computing devices, and other similar administration or control functions. For example, administration program 122 or an associated program may implement touch, tap, gesture or click detection and recording software to create and store digital records, in database 103 or other program storage, indicating specific user interactions with mobile computing device 106 when story application 108 is executing.

Database 103 may comprise a set of flat files, a relational database, an object database or other table-based, value-based or object-based data storage repository. In one embodiment, database 103 digitally stores a plurality of different story scripts 105, manifests 107 and metadata defining a plurality of different media presentations. The database 103 also may be programmed to maintain records of usage data or performance data relating to transmission, installation and use of story application 108. For example, database 103 may be programmed with analytics calculations, graphs and charts to output visualizations of usage, click, touch, tap or gesture activity with story application 108.

At mobile computing device 106, for purposes of illustrating a clear example, FIG. 1 shows three (3) different social media applications or apps 110A, 110B, 110C but other implementations may use any number of social media apps. Social media apps 110A, 110B, 110C may be installed on mobile computing device 106 before or after story application 108 is installed. In one embodiment, copies of the social media apps 110A, 110B, 110C are transmitted from server computer 102, under control of story service instance 120, at the time that the story application 108 is installed. Or, the story service instance 120 may transmit instructions to the mobile computing device 106 that redirect the device, or a user, to an online storage location such as an app store from which the device may download copies of the social media apps 110A, 110B, 110C. One or more of the social media apps 110A, 110B, 110C may comprise a clone or virtual implementation of a third-party, commercially offered or publicly available social media app. Or, the social media apps 110A, 110B, 110C may represent genuine copies of third-party, commercially offered or publicly available social media apps.

Various embodiments may use a plurality of different social media apps 110A, 110B, 110C having a plurality of different substantive functions, sources or brands. Examples of commercial or publicly available social media apps that could be used as the social media apps 110A, 110B, 110C include IMESSAGE, SNAPCHAT, INSTAGRAM, TIK-TOK, WHATSAPP, FACETIME, TWITTER, FACEBOOK MESSENGER. Any other social media app that supports communication via text, graphics, images, video or audio may be used, whether listed in the preceding sentence or developed in the future.

3. Example Program Flow

Figure 2A:
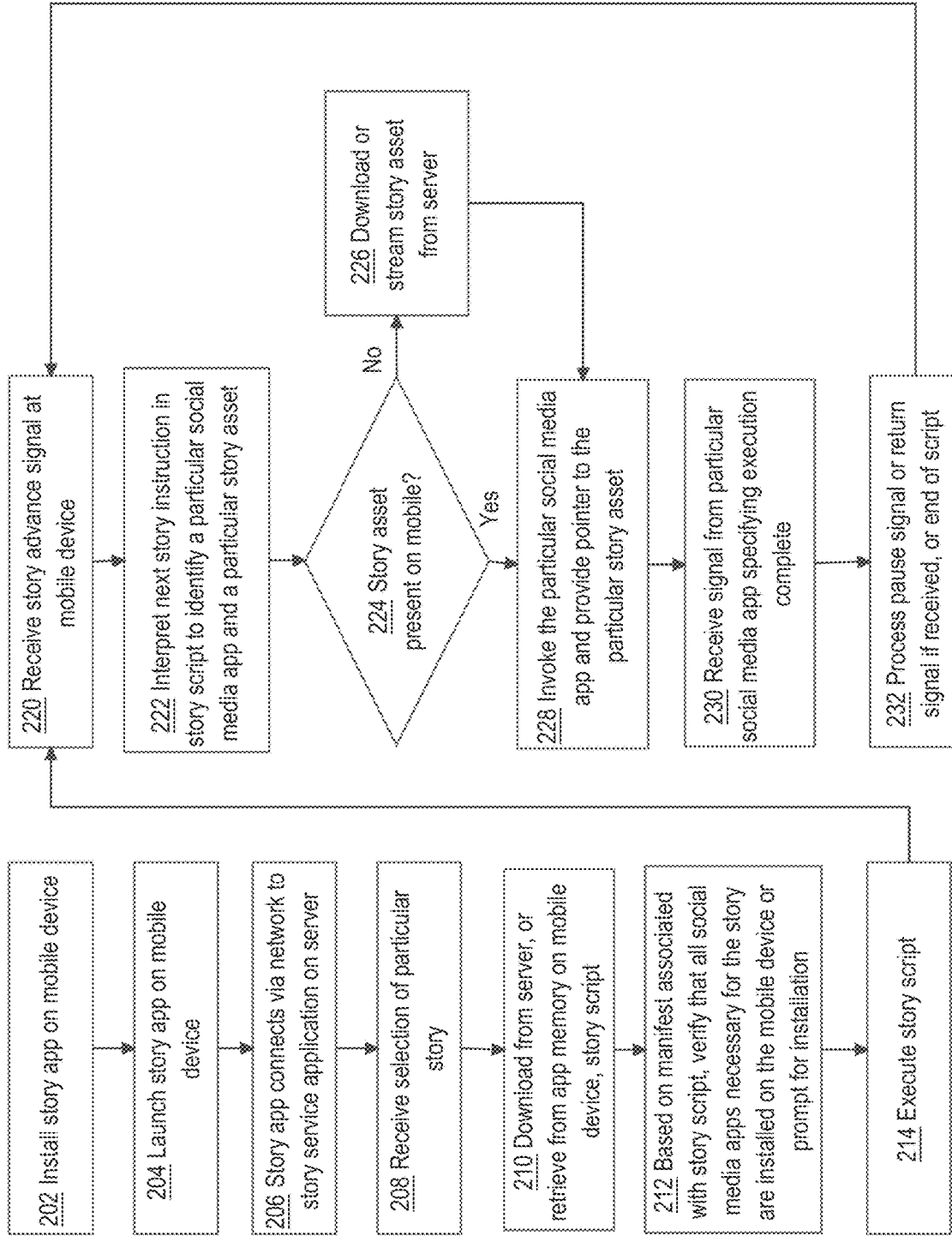
FIG. 2A illustrates an example programmed algorithm that may be used to implement an embodiment.
Figure 2B:
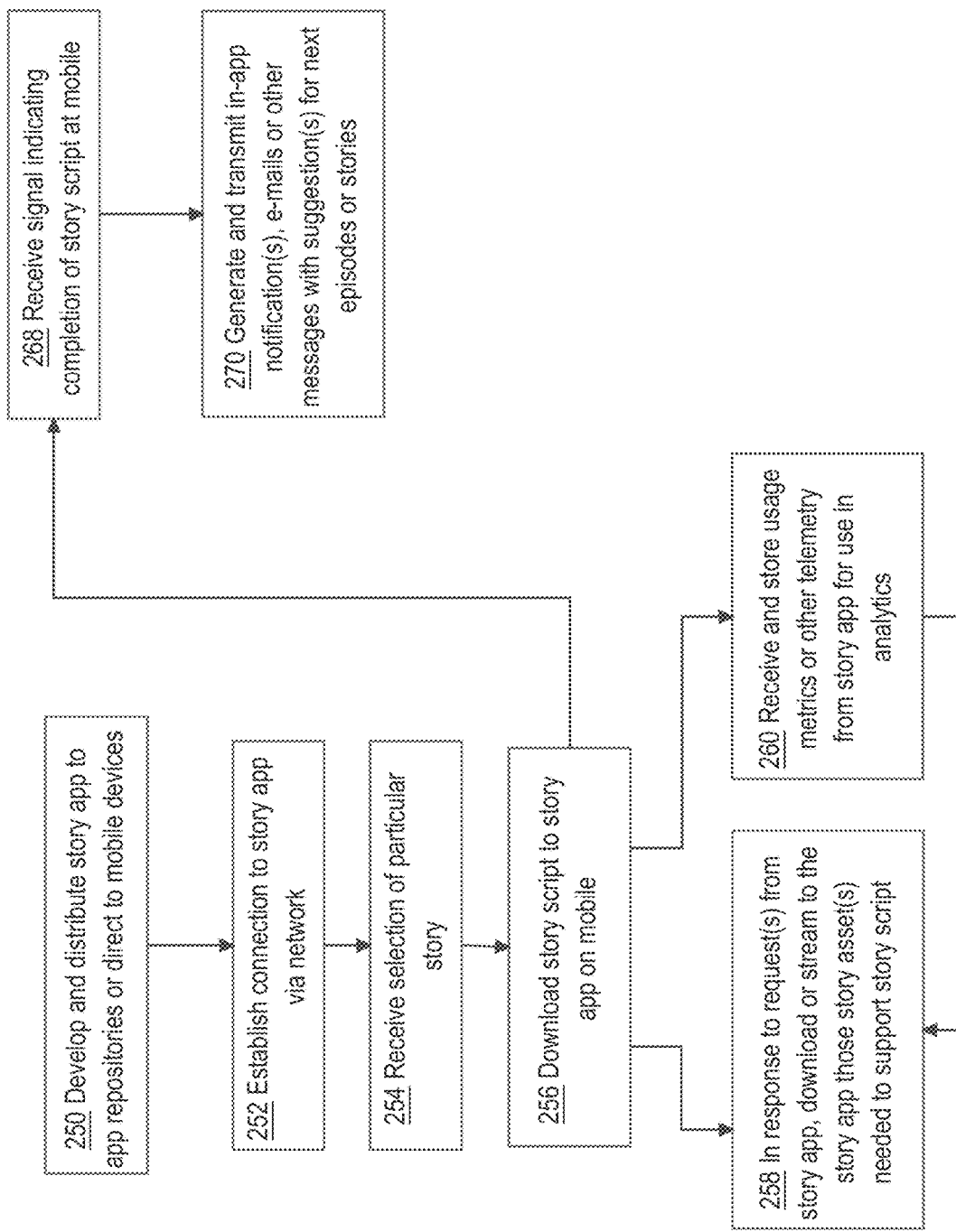
FIG. 2B illustrates an example programmed algorithm that may be used to implement an embodiment of a story application executed using a mobile computing device.

FIG. 2A illustrates an example programmed algorithm that may be used to implement an embodiment. For purposes of illustrating a clear example, FIG. 2A provides an overview of programmed functions that may be executed, in one embodiment, by elements of FIG. 1 to provide media presentations via social media apps. However, other implementations of FIG. 2A may be used with embodiments other than shown in FIG. 1. FIG. 2A, FIG. 2B, and each other flow diagram in this disclosure is intended to schematically represent an algorithm, process, or procedure that may be programmed to implement the functions that are described, and are shown at the same level of detail that is customarily used by persons having ordinary skill in the art to which this disclosure pertains to communicate among themselves about how to architect, organize, program and build computer program applications of the same class or type.

In the process of FIG. 2A, at block 202, the process is programmed or configured to install a story app on a mobile device. For example, mobile computing device 106 establishes a connection to an app store and downloads and installs a copy of story application 108. Or, mobile computing device 106 establishes a connection to server computer 102 and downloads a copy of story application 108 under control of story service instance 120 and/or administration program 122. The specific manner by which the mobile computing device 106 obtains and installs an executable copy of story application 108 is not critical.

In block 204, the story app on the mobile device is launched. For example, mobile computing device 106 receives a user touch signal indicating to launch story application 108, and operating system 140 responds by invoking and launching the story application.

In block 206, the story app connects via a network to a story service application on a server. For example, upon launching or otherwise during execution, story application 108 at mobile computing device establishes a protocol-specific connection via network 104 to story service instance 120 of server computer 102. Using the connection, in various embodiments, story service instance 120 can authenticate or validate the story application 108 as a legitimate copy, determine what story or stories the story application has loaded or needs, set up an encrypted tunnel or fully encrypted protocol-specific connection, and other functions.

At block 208, a selection of a particular story is received. For example, mobile device 106 receives a touch signal indicating user selection of a particular story via story application 108. In some embodiments, story application 108 may present a menu, tile display, box art display or other display of stories that have been installed on the mobile computing device 106, or that are available from server computer 120. In other embodiments, block 208 may be omitted and launching the story application 108 may be equivalent to selecting a single available or installed story and executing or presenting it.

In block 210, the process downloads from the server, or retrieves from app memory on the mobile device, a story script. For example, story application 108 may download story script 105 from story service instance 120, directly or by interfacing to database 103, or may retrieve a story script from in-app memory or other memory or storage on the mobile computing device 106.

At block 212, based on a manifest associated with the story script, the process verifies that all social media apps necessary for the story are installed on the mobile device, or prompts for installation. For example, as part of block 210 or as an independent operation, manifest 107 may be transmitted to story application 108. In response to obtaining the manifest, story application 108 may be programmed to read or interpret the manifest, identify a plurality of social media apps 110A, 110B, 110C that are needed to perform a particular story, and call services, functions or calls of operating system 140 to determine whether all such social media apps are then currently installed on the mobile computing device 106. If one or more necessary social media apps are not installed, then story application 108 may be programmed to prompt the mobile device 106 or a user via display device 142 to install a copy of the missing social media apps. Or, story application 108 may be programmed to redirect the mobile device to an app store or to a catalog or store of social media apps at server computer 102. In some embodiments, step 212 may include writing, to app memory at mobile computing device 106 associated with story application 108, a digital data table, file or other storage comprising a validated list of installed social media apps.

At block 214, the story script is executed. For example, story application 108 executes, parses or interprets story script 105 to begin presenting a media presentation. In some embodiments, each media presentation comprises a sequence or progression of display or presentation of different story elements using different social media apps. In one embodiment, story application 108 is programmed to present a media presentation by selecting the next single story element that is identified in the story script 105, invoking one of the social media apps 110A, 110B, 110 to present that single story element, and then enter a wait routine to wait for touch input of the user via display device 142 until receiving a signal to proceed. These operations are detailed in the following other blocks or steps of FIG. 2A.

At block 220, a story advance signal is received at the mobile device. For example, while in a wait state, story application 108 is programmed to receive a signal from operating system 140 indicating that a touch, tap or other gesture was input to display device 142. In one embodiment, a single tap on the screen constitutes a story advance signal, but other embodiments may use swipes in any direction, double taps, or other gestures to signal advancement.

In response, at block 222, the next story instruction in the story script is interpreted to identify a particular social media app and a particular story asset. For example, story application 108 reads the next instruction in the story script 105 and parses, interprets or executes the instruction, resulting in identifying a particular story asset or media element that is needed for presentation, and a particular one of the social media apps 110A, 110B, 110C that is needed for presentation.

Block 224 tests whether the story asset identified in block 222 is present on the mobile device. In some embodiments, block 224 may comprise story application 108 calling a service of the operating system 140 to determine whether a particular story asset is then currently installed on or stored in the mobile computing device 106. For example, the story script 105 may reference a video file. In some embodiments, the video file can be presented via a request to a media server or content delivery network (CDN) for streaming playback of the video file over network 104. In other embodiments, local storage of the video file may be preferred to provide more efficient or faster local playback.

If the particular story asset identified in block 222 is not present, then in block 226, the process downloads or streams the story asset from a server. For example, story application 108 may be programmed to download the story asset from server computer 102, or to stream the story asset from the server computer, or to initiate a request, via network 104, to a media server or CDN that is external to the system of FIG. 1 for streaming delivery of the story asset.

At block 228, the process invokes the particular social media app that was identified at block 222, and provides a pointer, URL or other programmatic reference to the particular story asset to cause the particular social media app to render or present the particular story asset. In some embodiments, invocation at block 228 comprises directly calling one of the social media apps 110A, 110B, 110C using an application programming interface (API) or other programmatic call mechanism that is publicly implemented by those social media apps. In other embodiments, the system of FIG. 1 may implement clones of third-party public social media apps and invocation may comprise calling a subroutine, method or other implementation of the clone social media apps, as part of the code implementation of story application 108.

Implicit in FIG. 2A, after block 228, is that the invoked social media app renders or presents the particular story asset. Upon completing that rendering or presentation, at block 230, a signal is received from the particular social media app specifying that execution is complete. Block 230 may be implemented by installing a callback handler in the social media app code, registering an interrupt handler with operating system 140, or calling an API call of the particular social media app that returns a signal or value indicating whether the social media app is presenting anything. The particular mechanism for determining that an invoked particular social media app has completed rendering or presentation is not critical.

At block 232, pause signal, return signal, or end of script condition is processed. Block 232 broadly represents program code of story application 108 to detect and respond to user input via display device 142 indicating a pause in the media presentation, as one example. Or, story application 108 may be programmed to enter a wait state and return control of the process to block 220 to await a next story advance signal. Or, story application 108 may be programmed to detect an end-of-script instruction or point in story script 105 and to present a closing message and/or close the story application. In an embodiment, if story script 105 contains additional instructions for rendering other story assets, then control transfers to block 220 to await an advance signal. Thus, the process of FIG. 2A from block 220 to block 232 can be viewed as a generally continuous loop to present each story asset represented in the story script, with advancement of the media presentation under user control based on story advance signals, until the complete media presentation is delivered.

In some embodiments, upon completion of a media presentation at block 232, the process of FIG. 2A or story application 108 may be programmed to display instructions via display device 142 specifying how to obtain, download or launch a subsequent episode of a multi-episode serial media presentation. Each episode may be associated with a separate story script 105 and manifest 107.

FIG. 2B illustrates an example programmed algorithm that may be used to implement an embodiment of a story application executed using a mobile computing device. FIG. 2B focuses on operations that may be executed at server computer 102 (FIG. 1) rather than end-user mobile computing devices.

At block 250, the story app is developed and distributed to app repositories or direct to mobile devices. For example, the story app is authored, compiled, tested and debugged, then copied to the APPLE APP STORE or GOOGLE PLAY STORE for distribution via downloads to end user devices. Or, executable binaries for the story app are hosted at server computer 102 for download.

At block 252, a connection is established from the server computer 102 to one of the mobile computing devices at the time that the devices execute the story app. The connection may use an app-specific protocol, parameterized HTTP or other protocols, the specifics of which are not critical. What is important is that the story app at a mobile device, and server computer 102, may establish either a long-lived session-based connection or a sessionless request-response connection for exchange of story data, story assets and/or telemetry data or usage data.

At block 254, the server computer 102 receives a selection of a particular story, for example, in an app-specific protocol message that consists of a request to provide a particular story using a unique story identifier. At block 256, server computer 102 downloads a story script to the story app on the mobile computing device that is making the request of block 254.

At block 258, in response to one or more requests from the story app, the server computer 102 downloads or streams to the story app the story asset(s) needed to support a particular story script. A process by which the story app may detect that the story app or mobile device is missing one or more story assets necessary for a particular story script has been previously described. Block 258 is typically executed while the story app is running on mobile devices.

Additionally or alternatively, at block 260, also during execution of the story app, the server computer receives and stores usage metrics or other telemetry data received from the story app for use in analytics on the server side. The specific metrics, usage data or other telemetry data may vary in different implementations but could include specific user taps, gestures or clicks, context data, data representing story beats, elements or assets that were played, not played, interacted with or abandoned by the user, and so forth.

At some point during execution of a story app at a mobile device, at block 268 the server computer 102 may receive a signal indicating completion of the story script at the mobile device. For example, the story app at a particular mobile device may reach the end of executing a story script and may be programmed to generate and transmit an app protocol message or callback to the server computer 102 to signal the end of a script. In response, server computer 102 may be programmed, as seen at block 270, to generate and transmit any of a variety of in-app notifications, emails or other messages, for example with suggestions for next episodes, next stories, related episodes or stories, or other scripted content that the mobile device can download, obtain or play.

4. Example Story Presentation

FIG. 3A, FIG. 3B illustrate a mobile computing device displaying a progressive sequence of story elements via a graphical user interface. FIG. 3A, FIG. 3B are intended to illustrate different states of visual presentation at display device 142 of the same mobile computing device 106 as different story assets or elements of a particular media presentation are presented, using multiple different social media apps, using the general process of FIG. 2A. FIG. 3A, FIG. 3B represent only one brief example of a media presentation and other implementations or embodiments may be programmed or configured to present other media presentations using different social media apps in different ways, with different text, characters, videos and other story assets, of any length, number of assets or complexity.

FIG. 3A illustrates four (4) states of the computing device 106 and display device 142 during progressive elements of a media presentation or story. In a first state, computing device 106 is in ordinary operation and displays a plurality of app icons 302 on a home screen of the display; some of the app icons may represent social media apps.

In a second state, execution of story script 105 by story application 108 causes invoking a text message app from among the social media apps 110A, 110B, 110C and displaying a new text message 304 on the display. This display appears in the same manner as other use of a text messaging app, overlaid on the display and without affecting the availability of app icons 302. In this particular example, the display shows a text message alert specifying that a new text message is available from a fictional character Alice and directed to another fictional character Bob.

Assume that in response to the second state, touch input is received four (4) successive times, spaced apart in time, each touch input indicating advancement of the media presentation. For example, four (4) tap gestures could be received, spaced apart. In response to each tap, story application 108 interprets the next instructions of story script 105 and again invokes the text messaging app with different text for each instruction. As a result, mobile computing device first displays a text messaging window 305, then displays four (4) successively different text messages 306 that comprise a story element, or a plurality of story assets. Each text message comprises a separate story asset or script element representing fictional communication between a first character and a second character as part of a particular media presentation. This disclosure contemplates that each test message bubble within text messaging window 305 is successively displayed in the window in response to successive taps, gestures or other touches.

The use of window 305 and text messages 306 represents a third state of FIG. 3A. In an embodiment, after the third state, the story application enters a wait state or a pause state. Wait states or pause states may be programmed as part of story script 105 to add, to a particular media presentation, dramatic impact or the impression of real use of social media apps by real persons rather than characters, and/or to enable recovery of memory or storage on the mobile computing device when one app closes.

In a fourth state seen in FIG. 3A, after receiving an advancement signal, the story app interprets a next instruction of the story script which specifies invoking a video call or video conference app for a simulated video call between characters Alice and Bob. A commercial example of a video call or video conference app that could be invoked at this point is APPLE FACETIME. Input of an advancement signal transitions the story app to the states shown in FIG. 3B.

Referring now to FIG. 3B, in a fifth state of mobile computing device 106, execution of the story app has caused invocation of a video call app which displays a video window 310 on the display device with playback of a first video element 312 and a second video element 314. In one embodiment, first video element 312 displays video of a first character during a simulated video call and the second video element 314 displays video of a second character during the same simulated video call. In an embodiment, both video elements 312, 314 may be recorded in a single media asset that is presented in video window 310. That is, rather than consisting of independent video streams of the calling party and the called party, which occurs in conventional use of video call application such as APPLE FACETIME, video window 310 may display a single video asset that contains simulated independent video elements.

A sixth state may comprise a group text experience 316. In an embodiment, group text experience 316 is presented in the same manner as the text messaging experience of FIG. 3A but involves multiple characters. The group text experience 316 may present a plurality of different text messages in the manner of FIG. 3A but structured to appear to be originating from and/or directed to a plurality of different characters.

In response to another advancement signal, a seventh state may comprise an announcement 318 of a short video story from a particular character. In an embodiment, the seventh state may be presented in response to story application 108 interpreting story script 105 and identifying an instruction to invoke an image/video sharing app. A commercial example of an image/video sharing app is INSTAGRAM.

In an embodiment, in an eighth state, in response to another advancement signal, the image/video sharing app is invoked and provided with a reference to a story asset comprising an image or short video. In response, the image/video sharing app renders or displays the image or short video in a window 320. The window 320 may include active, user-selectable and usable widgets and functions as part of the ordinary operation of the social media app, while the window is playing the story asset that is associated with the current media production. For example, a text message input field 322 may be displayed as part of the image/video sharing app, and a user of the mobile computing device 106 may enter a message to a real individual using the field.

Thus, embodiments may invoke and use the same social media apps as have been previously installed on the mobile computing device 106, for presentation of story assets of a particular media production involving fictional characters, without terminating or inhibiting the conventional functionality of the social media apps that are invoked. Embodiments are specifically programmed to implement media presentation and/or entertainment functions according to a scripted story, using actual social media apps on the mobile computing device 106, for informational, educational or entertainment purposes without terminating or inhibiting the conventional functionality of the social media apps that are invoked. Therefore, the mobile computing device 106 and its plurality of different installed social media apps 110A, 110B, 110C acquire new, hybrid utility as both a conventional social media platform for the user and an educational, informational or entertainment presentation platform that is driven by a story application and story script.

TABLE 1 illustrates an example of a story script 105 that could be used to control execution of the media presentation of FIG. 3A, FIG. 3B.

TABLE 1

```
<story>
    <textapp> <text> {Alice,Bob@Alice} {Let's go up to
Melrose like now. I need better shopping.} </text>
        <text> {Alice,Bob@Bob} {I'm tired after all the
drama with Sue.} </text>
        <text> {Alice,Bob@Bob}{I don't like jewelry
anyway.} </text>
        <text> <text> {Alice,Bob@Alice}{I'm being followed.
Can we video chat?}
    </textapp>
    <videoTime> <videocall> {Alice,Bob@Alice} {init}
    </videocall>
        <videocall> {Alice,Bob@Alice}
{https://server.com/Alice_calls_Bob.mpg}
        </videocall>
    </videoTime>
    <textapp> <grouptext> {Alice, Bob,Charlie@Alice} {init}
    </textapp>
    <videogram> {@Charlie} <init> </videogram>
    <videogram> {@Charlie} {https://server.com/
Charlie_forest_videog.mpg} </videogram>
    ...
</story>
```

5. Implementation Example—Computer Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Implementation Example—Hardware Overview

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques, or may include digital electronic devices such as at least one application-specific integrated circuit (ASIC) or field programmable gate array (FPGA) that is persistently programmed to perform the techniques, or may include at least one general purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

FIG. 4 illustrates an example computer system with which some aspects of embodiments may be implemented. In the example of FIG. 4, a computer system 400 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 400 includes an input/output (I/O) subsystem 402 which may include a bus and/or other communication mechanism(s) for communicating information and/or instructions between the components of the computer system 400 over electronic signal paths. The I/O subsystem 402 may include an I/O controller, a memory controller and at least one I/O port. The electronic signal paths are represented schematically in the drawings, for example as lines, unidirectional arrows, or bidirectional arrows.

At least one hardware processor 404 is coupled to I/O subsystem 402 for processing information and instructions. Hardware processor 404 may include, for example, a general-purpose microprocessor or microcontroller and/or a special-purpose microprocessor such as an embedded system or a graphics processing unit (GPU) or a digital signal processor or ARM processor. Processor 404 may comprise an integrated arithmetic logic unit (ALU) or may be coupled to a separate ALU.

Computer system 400 includes one or more units of memory 406, such as a main memory, which is coupled to I/O subsystem 402 for electronically digitally storing data and instructions to be executed by processor 404. Memory 406 may include volatile memory such as various forms of random-access memory (RAM) or other dynamic storage device. Memory 406 also may be used for storing temporary variables or other intermediate information during execution of instructions to be executed by processor 404. Such instructions, when stored in non-transitory computer-readable storage media accessible to processor 404, can render computer system 400 into a special-purpose machine that is customized to perform the operations specified in the instructions.

Computer system 400 further includes non-volatile memory such as read only memory (ROM) 408 or other static storage device coupled to I/O subsystem 402 for storing information and instructions for processor 404. The ROM 408 may include various forms of programmable ROM (PROM) such as erasable PROM (EPROM) or electrically erasable PROM (EEPROM). A unit of persistent storage 410 may include various forms of non-volatile RAM (NVRAM), such as FLASH memory, or solid-state storage, magnetic disk or optical disk such as CD-ROM or DVD-ROM and may be coupled to I/O subsystem 402 for storing information and instructions. Storage 410 is an example of a non-transitory computer-readable medium that may be used to store instructions and data which when executed by the processor 404 cause performing computer-implemented methods to execute the techniques herein.

The instructions in memory 406, ROM 408 or storage 410 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server or web client. The instructions may be organized as a presentation layer, application layer and data storage layer such as a relational database system using structured query language (SQL) or no SQL, an object store, a graph database, a flat file system or other data storage.

Computer system 400 may be coupled via I/O subsystem 402 to at least one output device 412. In one embodiment, output device 412 is a digital computer display. Examples of a display that may be used in various embodiments include a touch screen display or a light-emitting diode (LED) display or a liquid crystal display (LCD) or an e-paper display. Computer system 400 may include other type(s) of output devices 412, alternatively or in addition to a display device. Examples of other output devices 412 include printers, ticket printers, plotters, projectors, sound cards or video cards, speakers, buzzers or piezoelectric devices or other audible devices, lamps or LED or LCD indicators, haptic devices, actuators or servos.

At least one input device 414 is coupled to I/O subsystem 402 for communicating signals, data, command selections or gestures to processor 404. Examples of input devices 414 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 416, which may perform cursor control or other automated control functions such as navigation in a graphical interface on a display screen, alternatively or in addition to input functions. Control device 416 may be a touchpad, a mouse, a trackball, or cursor direction keys for communicating direction information and command selections to processor 404 and for controlling cursor movement on display 412. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 414 may include a combination of multiple different input devices, such as a video camera and a depth sensor.

In another embodiment, computer system 400 may comprise an internet of things (IoT) device in which one or more of the output devices 412, input device 414, and control device 416 are omitted. Or, in such an embodiment, the input device 414 may comprise one or more cameras, motion detectors, thermometers, microphones, seismic detectors, other sensors or detectors, measurement devices or encoders and the output device 412 may comprise a special-purpose display such as a single-line LED or LCD display, one or more indicators, a display panel, a meter, a valve, a solenoid, an actuator or a servo.

When computer system 400 is a mobile computing device, input device 414 may comprise a global positioning system (GPS) receiver coupled to a GPS module that is capable of triangulating to a plurality of GPS satellites, determining and generating geo-location or position data such as latitude-longitude values for a geophysical location of the computer system 400. Output device 412 may include hardware, software, firmware and interfaces for generating position reporting packets, notifications, pulse or heartbeat signals, or other recurring data transmissions that specify a position of the computer system 400, alone or in combination with other application-specific data, directed toward host 424 or server 430.

Computer system 400 may implement the techniques described herein using customized hard-wired logic, at least one ASIC or FPGA, firmware and/or program instructions or logic which when loaded and used or executed in combination with the computer system causes or programs the computer system to operate as a special-purpose machine. According to one embodiment, the techniques herein are performed by computer system 400 in response to processor 404 executing at least one sequence of at least one instruction contained in main memory 406. Such instructions may be read into main memory 406 from another storage medium, such as storage 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 410. Volatile media includes dynamic memory, such as memory 406. Common forms of storage media include, for example, a hard disk, solid state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 402. Transmission media can also take the form of acoustic or light waves, such as those generated during radio-wave and infra-red data communications.

Various forms of media may be involved in carrying at least one sequence of at least one instruction to processor 404 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 400 can receive the data on the communication link and convert the data to a format that can be read by computer system 400. For instance, a receiver such as a radio frequency antenna or an infrared detector can receive the data carried in a wireless or optical signal and appropriate circuitry can provide the data to I/O subsystem 402 such as place the data on a bus. I/O subsystem 402 carries the data to memory 406, from which processor 404 retrieves and executes the instructions. The instructions received by memory 406 may optionally be stored on storage 410 either before or after execution by processor 404.

Computer system 400 also includes a communication interface 418 coupled to bus 402. Communication interface 418 provides a two-way data communication coupling to network link(s) 420 that are directly or indirectly connected to at least one communication networks, such as a network 422 or a public or private cloud on the Internet. For example, communication interface 418 may be an Ethernet networking interface, integrated-services digital network (ISDN) card, cable modem, satellite modem, or a modem to provide a data communication connection to a corresponding type of communications line, for example an Ethernet cable or a metal cable of any kind or a fiber-optic line or a telephone line. Network 422 broadly represents a local area network (LAN), wide-area network (WAN), campus network, internetwork or any combination thereof. Communication interface 418 may comprise a LAN card to provide a data communication connection to a compatible LAN, or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 418 sends and receives electrical, electromagnetic or optical signals over signal paths that carry digital data streams representing various types of information.

Network link 420 typically provides electrical, electromagnetic, or optical data communication directly or through at least one network to other data devices, using, for example, satellite, cellular, Wi-Fi, or BLUETOOTH technology. For example, network link 420 may provide a connection through a network 422 to a host computer 424.

Furthermore, network link 420 may provide a connection through network 422 or to other computing devices via internetworking devices and/or computers that are operated by an Internet Service Provider (ISP) 426. ISP 426 provides data communication services through a world-wide packet data communication network represented as internet 428. A server computer 430 may be coupled to internet 428. Server 430 broadly represents any computer, data center, virtual machine or virtual computing instance with or without a hypervisor, or computer executing a containerized program system such as DOCKER or KUBERNETES. Server 430 may represent an electronic digital service that is implemented using more than one computer or instance and that is accessed and used by transmitting web services requests, uniform resource locator (URL) strings with parameters in HTTP payloads, API calls, app services calls, or other service calls. Computer system 400 and server 430 may form elements of a distributed computing system that includes other computers, a processing cluster, server farm or other organization of computers that cooperate to perform tasks or execute applications or services. Server 430 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 430 may comprise a web application server that hosts a presentation layer, application layer and data storage layer such as a relational database system using structured query language (SQL) or no SQL, an object store, a graph database, a flat file system or other data storage.

Computer system 400 can send messages and receive data and instructions, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage 410, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 404. While each processor 404 or core of the processor executes a single task at a time, computer system 400 may be programmed to implement multitasking to allow each processor to switch between tasks that are being executed without having to wait for each task to finish. In an embodiment, switches may be performed when tasks perform input/output operations, when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, an operating system may prevent direct communication between independent processes, providing strictly mediated and controlled inter-process communication functionality.

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer-readable storage medium storing one or more sequences of instructions which, when executed by one or more processors of a mobile computing device, cause the mobile computing device to execute:

receiving, at a story application of the mobile computing device, a selection of a first story among a plurality of different stories associated with different social media applications;

retrieving a digitally stored story script corresponding to the first story and a manifest associated with the story script, the manifest comprising location references of two or more story elements of the first story and identifying a plurality of different social media applications that the story will invoke;

identifying, from the story script, a first story element among a plurality of other story elements;

providing a first location reference of the first story element to a first social media application, and based on the first location reference, invoking the first social media application among the different social media applications on the mobile computing device and programmatically causing the first social media application to present the first story element based on the story script;

presenting, at the first social media application, the first story element via the first social media application;

repeating the identifying and invoking for the plurality of other story elements and the different social media applications.

2. The non-transitory computer-readable storage medium of claim 1, the first social media application being a clone or a virtual implementation of a third-party social media application.

3. The non-transitory computer-readable storage medium of claim 1, further comprising sequences of instructions which, when executed by the one or more processors of the mobile computing device, cause the mobile computing device to execute:

selecting the first social media application from among the different social media applications based on a type of the first story element.

4. The non-transitory computer-readable storage medium of claim 1, further comprising sequences of instructions which, when executed by the one or more processors of the mobile computing device, cause the mobile computing device to execute:

receiving an input signal from the mobile computing device to advance the first story.

5. The non-transitory computer-readable storage medium of claim 1, further comprising sequences of instructions which, when executed by the one or more processors of the mobile computing device, cause the mobile computing device to execute:

in response to receiving the selection of the first story, downloading the story script from a story service instance of a server computer.

6. The non-transitory computer-readable storage medium of claim 1, further comprising sequences of instructions which, when executed by the one or more processors of the mobile computing device, cause the mobile computing device to execute:

before identifying the first story element among the plurality of other story elements from the story script, determining, based on the manifest, that a particular social media application among the different social media applications identified in the manifest is not installed on the mobile computing device, and in response, automatically downloading the particular social media application to the mobile computing device.

7. The non-transitory computer-readable storage medium of claim 6, further comprising sequences of instructions which, when executed by the one or more processors of the mobile computing device, cause the mobile computing device to execute:

receiving a story advance signal at the mobile computing device;

interpreting a next story instruction of the story script to identify a particular next story asset;

determining that the particular next story asset is not present on the mobile computing device, and in response, downloading or streaming the particular next story asset from the server computer to the mobile computing device;

invoking the particular social media application on the mobile computing device that is associated in the manifest with the particular next story asset and providing, to the particular social media application, a pointer to the particular next story asset.

8. The non-transitory computer-readable storage medium of claim 1, further comprising sequences of instructions which, when executed by the one or more processors of the mobile computing device, cause the mobile computing device to execute:

receiving, from the first social media application, a signal indicating that presentation of the first story element at the first social media application is complete.

9. The non-transitory computer-readable storage medium of claim 1, the story script comprising a sequence of element identifiers of story elements associated with the first story and application identifiers of one or more social media applications respectively associated with each story element in the story elements.

10. The non-transitory computer-readable storage medium of claim 1, further comprising sequences of instructions which, when executed by the one or more processors of the mobile computing device, cause the mobile computing device to execute:

in response to invoking the first social media application, entering, at the story application, a wait routine until an input signal requesting advancement of the first story is received from the mobile computing device.

11. The non-transitory computer-readable storage medium of claim 1, further comprising sequences of instructions which, when executed by the one or more processors of the mobile computing device, cause the mobile computing device to execute:

presenting, at the story application, instructions specifying how to launch a second story associated with the first story.

12. The non-transitory computer-readable storage medium of claim 11, the second story being associated with a second story script and a second manifest.

13. The non-transitory computer-readable storage medium of claim 1, the story element comprising a single video stream that contains a plurality of simulated independent video streams.

14. The non-transitory computer-readable storage medium of claim 2, further comprising sequences of instructions which, when executed by the one or more processors of the mobile computing device, cause the mobile computing device to execute:

maintaining real-time functionality of the first social media application while presenting the first story element.

15. The non-transitory computer-readable storage medium of claim 1, each of the social media applications being virtual social media applications that are implemented as part of the sequences of instructions and not as real social media applications associated with third parties.

16. A computer-implemented method comprising:

receiving, at a story application of a mobile computing device, a selection of a first story among a plurality of different stories associated with different social media applications;

retrieving a digitally stored story script corresponding to the first story and a manifest associated with the story script, the manifest comprising location references of two or more story elements of the first story and identifying a plurality of different social media applications that the story will invoke;

identifying, from the story script, a first story element among a plurality of other story elements;

providing a first location reference of the first story element to a first social media application, and based on the first location reference, invoking the first social media application among the different social media applications on the mobile computing device and programmatically causing the first social media application to present the first story element based on the story script;

presenting the first story element via the first social media application;

repeating the identifying and invoking for the plurality of other story elements and the different social media applications.

17. The computer-implemented method of claim 16, the first social media application being a clone or a virtual implementation of a third-party social media application.

18. The computer-implemented method of claim 16, further comprising, before identifying the first story element among the plurality of other story elements from the story script, determining, based on the manifest, that a particular social media application among the different social media applications identified in the manifest is not installed on the mobile computing device, and in response, automatically downloading the particular social media application to the mobile computing device.

19. The computer-implemented method of claim 16, further comprising:

receiving a story advance signal at the mobile computing device;

interpreting a next story instruction of the story script to identify a particular next story asset;

determining that the particular next story asset is not present on the mobile computing device, and in response, downloading or streaming the particular next story asset from the server computer to the mobile computing device;

invoking the particular social media application on the mobile computing device that is associated in the manifest with the particular next story asset and providing, to the particular social media application, a pointer to the particular next story asset.

20. The computer-implemented method of claim 16, the story script comprising a sequence of element identifiers of story elements associated with the first story and application identifiers of one or more social media applications respectively associated with each story element in the story elements.

21. The computer-implemented method of claim 16, further comprising maintaining real-time functionality of the first social media application while presenting the first story element.

* * * * *